US011669438B2

(12) United States Patent
Huth et al.

(10) Patent No.: US 11,669,438 B2
(45) Date of Patent: Jun. 6, 2023

(54) METHOD FOR TESTING A SYSTEM

(71) Applicant: Robert Bosch GmbH, Stuttgart (DE)

(72) Inventors: Christopher Huth, Leonberg (DE); Hans Loehr, Nuremberg (DE); Rakshith Amarnath, Hemmingen (DE); Simon Greiner, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 46 days.

(21) Appl. No.: 16/892,779

(22) Filed: Jun. 4, 2020

(65) Prior Publication Data

US 2021/0026760 A1   Jan. 28, 2021

(30) Foreign Application Priority Data

Jul. 25, 2019  (DE) .......................... 102019211037.1

(51) Int. Cl.
*G06F 11/36*    (2006.01)
*G06F 11/07*    (2006.01)

(52) U.S. Cl.
CPC ...... *G06F 11/3688* (2013.01); *G06F 11/0772* (2013.01); *G06F 11/3684* (2013.01); *G06F 11/3692* (2013.01)

(58) Field of Classification Search
CPC ............. G06F 11/3604; G06F 11/3608; G06F 11/3684; G06F 11/3612; G06F 11/3409; G06F 11/3664; G06F 11/3688; G06F 11/3692; G06F 11/3672; G06F 11/362; G06F 11/366; G06F 11/079; G06F 11/3676
See application file for complete search history.

(56) References Cited

U.S. PATENT DOCUMENTS 6,016,466 A * 1/2000 Guinther ............. G06F 11/3644
                                                    714/39
7,284,274 B1 * 10/2007 Walls ........................ G06F 8/70
                                                    726/25
(Continued)

FOREIGN PATENT DOCUMENTS

WO   WO-2009095741 A1 *  8/2009   ......... G06F 11/3688
WO      2014180107 A1    11/2014

OTHER PUBLICATIONS

Koc et al ; Learning a Classifier for False Positive Error Reports Emitted by Static Code Analysis Tools, 8 pages (Year: 2017).*
(Continued)

*Primary Examiner* — Wei Y Zhen
*Assistant Examiner* — Brahim Bourzik
(74) *Attorney, Agent, or Firm* — Norton Rose Fulbright US LLP; Gerard Messina

(57) ABSTRACT

A computer-implemented method for testing a system, the tested system being a computer program, a hardware system, or an embedded system. In the method, using a static analysis, a first part of an execution structure for the system is examined to see if the system runs corresponding execution paths without errors when the first part of the execution structure is executed. If in the static analysis error-free execution is determined for the first part of the execution structure, the system is examined using a dynamic analysis which leaves out execution paths which correspond to the first part of the execution structure.

18 Claims, 2 Drawing Sheets

(56) References Cited

U.S. PATENT DOCUMENTS

| | | | | |
|---|---|---|---|---|
| 7,340,726 B1* | 3/2008 | Chelf | | G06F 11/3604 |
| | | | | 714/38.12 |
| 9,372,785 B2* | 6/2016 | Wang | | G06F 21/55 |
| 11,200,144 B1* | 12/2021 | Cook | | G06F 11/3608 |
| 2003/0131284 A1* | 7/2003 | Flanagan | | G06F 8/75 |
| | | | | 717/126 |
| 2008/0295071 A1* | 11/2008 | Schellekens | | G06F 11/3612 |
| | | | | 717/106 |
| 2009/0259989 A1* | 10/2009 | Cifuentes | | G06F 11/3604 |
| | | | | 717/110 |
| 2012/0222013 A1 | 8/2012 | Zheng et al. | | |
| 2014/0096113 A1* | 4/2014 | Kuehlmann | | G06F 11/3672 |
| | | | | 717/126 |
| 2015/0052505 A1* | 2/2015 | Mulat | | G06F 11/3608 |
| | | | | 717/131 |
| 2015/0317234 A1 | 11/2015 | Ligman et al. | | |
| 2015/0339217 A1* | 11/2015 | Avgerinos | | G06F 11/3688 |
| | | | | 717/132 |
| 2016/0210216 A1* | 7/2016 | Monahan | | G06F 11/3093 |
| 2016/0335175 A1* | 11/2016 | Copos | | G06F 11/3684 |
| 2018/0232523 A1* | 8/2018 | Copty | | G06F 21/53 |
| 2019/0205543 A1 | 7/2019 | Wei et al. | | |
| 2020/0394311 A1* | 12/2020 | Li | | G06F 21/563 |

OTHER PUBLICATIONS

Cheirdari et al ; Analyzing False Positive Source Code Vulnerabilities Using Static Analysis Tools; 7 pages (Year: 2018).*

Baldoni, Roberto et al., "A Survey of Symbolic Execution Techniques." ACM Computing Surveys (CSUR) 51.3 (2018), Retrieved from the Internet on May 29, 2020: https://dl.acm.org/doi/pdf/10.1145/3182657, 39 Pages.

* cited by examiner

METHOD FOR TESTING A SYSTEM

CROSS REFERENCE

The present application claims the benefit under 35 U.S.C. § 119 of German Patent Application No. DE 102019211037.1 filed on Jul. 25, 2019, which is expressly incorporated herein by reference in its entirety.

FIELD

The present invention relates to a computer-implemented method for testing a system, in particular a computer program, a hardware system or an embedded system, and to computer programs and testing systems designed for this purpose.

BACKGROUND INFORMATION

A conventional method for dynamically testing systems for weak points is so-called fuzz testing (also: fuzzy testing or fuzzing). In this approach, a tested system (SUT—system under test) is executed, typically a computer program or part of a computer program. The program is executed depending on input parameters which the system receives from a fuzzer. While the system is being executed, in particular while the software is running, in other words while it is being processed by a processor, the fuzzer observes the behavior of the tested system. In the process, it identifies provided input parameters as being error-relevant if the tested system terminates during execution or if it exhibits other undesired behavior.

Conventional, available fuzzers include Libfuzz, AFL-fuzz or Hongfuzz, for example.

However, dynamic approaches to software tests such as fuzzing tend to involve superficial analyses since deep paths through the tested computer program are often not found. In addition, the fuzzing efficiency depends on the speed of execution of the tested system. The more executions that are possible for a tested system, the more input parameters can be tested to see if any erroneous system behavior occurs for them.

Other conventional approaches for testing computer programs for weak points include static methods such as symbolic execution, concolic—concrete-symbolic—execution, abstract interpretation, model checking or limited model checking. In these approaches, the source code, or an intermediate code (intermediate representation), is analyzed using formal mathematical methods. These techniques make it possible to provide guarantees as to which kind of errors are present in a software.

The following document provides an overview of symbolic and concolic execution and abstract interpretation methods: Baldoni, Roberto, et al. "A survey of symbolic execution techniques." ACM Computing Surveys (CSUR) 51.3 (2018): 50.

Static analytical approaches for software depend on the problem concerning whether or to what extent a specific computer program can be formally verified, a problem that is often undecidable. In order to provide automatic, computer-implemented analysis tools, in general an over-approximation must be performed. Thus, static analyses often give many false positive results. For example, on the one hand they report problems in the tested system which cannot arise in an actual execution of the tested system, or they report input parameters which should lead to a specific program path being run through but which result in a different program path being run through when the computer program is actually executed. The precision and execution time of static analyses can depend strongly on the size of the analyzed program, in addition to other criteria.

SUMMARY

In accordance with example embodiment of the present invention, a computer-implemented method is provided for testing a system, the tested system being or comprising a computer program, a hardware system, or an embedded system in particular.

In the example process, a first part of an execution structure for the system is examined using a static analysis to see whether the system runs without errors when execution paths corresponding to the first part of the execution structure are executed.

In this case, the static analysis comprises a computer-implemented examination of the system without actually executing the system, preferably using an execution structure and using a formal mathematical method. Static analysis may preferably include model checking, limited model checking, examination using theorem provers, typification, abstract interpretation, symbolic execution or concolic execution.

If, in the static analysis, error-free execution is determined for the first part of the execution structure, the system is examined using a dynamic analysis which leaves out execution paths which correspond to the first part of the execution structure or specifically does not execute said paths.

It is preferable for the dynamic analysis to examine whether the system is executed error-free for at least one specific input parameter. In the process, the analysis comprises a computer-implemented examination of the system while the system is actually being executed. It is preferable for the dynamic analysis to involve fuzzing, in particular the dynamic analysis is performed for at least one input parameter generated by a fuzzer.

Thus, a test method is provided in accordance with an example embodiment of the present invention which, when combined with a static analysis, provides very efficient dynamic testing of a system. In particular, the gradual reduction by the static analysis of the number of execution paths to be tested in the dynamic analysis allows the execution time of the dynamic analysis to be reduced in step-by-step fashion as the static analysis proceeds or is repeated.

In addition, only a part of the execution structure is taken into account in the static analysis, which likewise makes this examination very efficient and increases the possible precision of the static examination techniques being used.

In an especially preferred embodiment, in a further static analysis the first part of the execution structure is left out if error-free execution is determined in the static analysis for said first part of the execution structure. Thus, further static analysis of the execution structure takes place after the static analysis is finished for the first part of the structure. This also ensures that the static analysis proceeds efficiently and that when the static analysis is repeated, the part of the execution structure remaining to be examined becomes smaller and smaller.

In another preferred embodiment, if the static analysis has determined an execution with errors for the first part of the execution structure, a first input parameter is calculated for the first part of the execution structure depending on the static analysis, said first input parameter being stored in a set of input parameters to be taken into account for a dynamic analysis. In particular, in this case the first calculated input parameter is one for which the static analysis indicates that errors are occurring in the execution.

This allows targeted light to be shed once more in the dynamic analysis on substructures which had been identified in the static analysis as being error laden. For example, if a static analysis provides false positive errors, this can be uncovered in the dynamic analysis. Errors which actually exist can also be verified accordingly in this way. This provides an advantageous test method overall.

In a preferred embodiment of the present invention, static analysis steps and dynamic analysis steps are executed in parallel. This allows the advantages of the methods to be implemented especially quickly and efficiently. On the other hand, if sufficient parallel computing capacities are not available for example, an alternative embodiment can also implement the advantages by executing the examination of the static analysis and the examination of the dynamic analysis in succession or sequentially. In particular, in both variants it is possible for the dynamic analyses and the static analyses to be repeated in loops.

In preferred embodiments of the example methods according to the present invention, the tested system comprises a computer program, the execution structure is a tree structure representing execution paths of the computer program and the dynamic analysis comprises execution of a program code of the computer program on a processor. For systems which are implemented by computer programs or which contain computer programs, the method described can be implemented particularly efficiently for automated system tests.

In a further preferred embodiment of the present invention, the examination of the first part of the execution structure for the system is carried out in the static analysis using two different analysis methods, the first analysis method examining the first part of the execution structure from a root of the execution structure in the direction of a leaf of the execution structure and the second analysis method examining the first part of the execution structure from the leaf of the execution structure in the direction of the root of the execution structure. In this case, both analysis methods are preferred to be implemented simultaneously in the static analysis of a sub-tree of the execution structure. This allows the size of the part of the structure to be examined by each analysis method to be reduced, which makes it possible to carry out the static analysis faster and with a higher precision.

In preferred embodiments of the present invention, the errors for which the system is examined in the static and/or the dynamic analysis include at least a runtime exception, a violated assertion, an assumption of an inadmissible system state, a system termination, an erroneous memory access, an erroneous resource access or a program lock-up, in particular a state in which a computer program ceases to run. By checking for these possible critical system errors, the security and seamless functioning of the system can be established. Also, in an especially preferred embodiment, determined errors, in particular the error types described, may be automatically fixed, in particular depending on the results of the dynamic analysis. This not only provides a method for examining system execution errors that is efficient in its processing, but at the same time provides a system with improved execution.

Below, specific example embodiments of the present invention are explained in more detail with reference to the Figures.

DETAILED DESCRIPTION OF EXAMPLE EMBODIMENTS

The present invention is described below, with priority being placed on the case in which the system to be tested is or contains a computer program. In this regard, the system to be tested can be a computer program as such or an embedded system comprising a computer program. However, the example methods described are also accordingly suitable if the system to be tested is a strictly hardware-based system.

Automated dynamic tests can be carried out on a tested system (system under test) by a computer-implemented testing system. In the process, the testing system generates input parameters for the tested system, executes or initiates the execution of the tested system, and observes the tested system to determine erroneous behavior. The tested system receives the input parameters and carries out a calculation based on these parameters. In a test of a computer program in particular, program execution involves a processor processing the computer program.

Dynamic tests of computer programs may keep a log for input parameters which bring about an erroneous execution of the computer program (error set). The programs may also keep a log (for example a partial log) for test cases which were already carried out, in particular a log for the corresponding input parameters of said tests (input parameter set or input set). Furthermore, they can keep a log for input parameters which are interesting for the testing system so as to calculate other additional input parameters for tests of the tested system.

Figure 1:
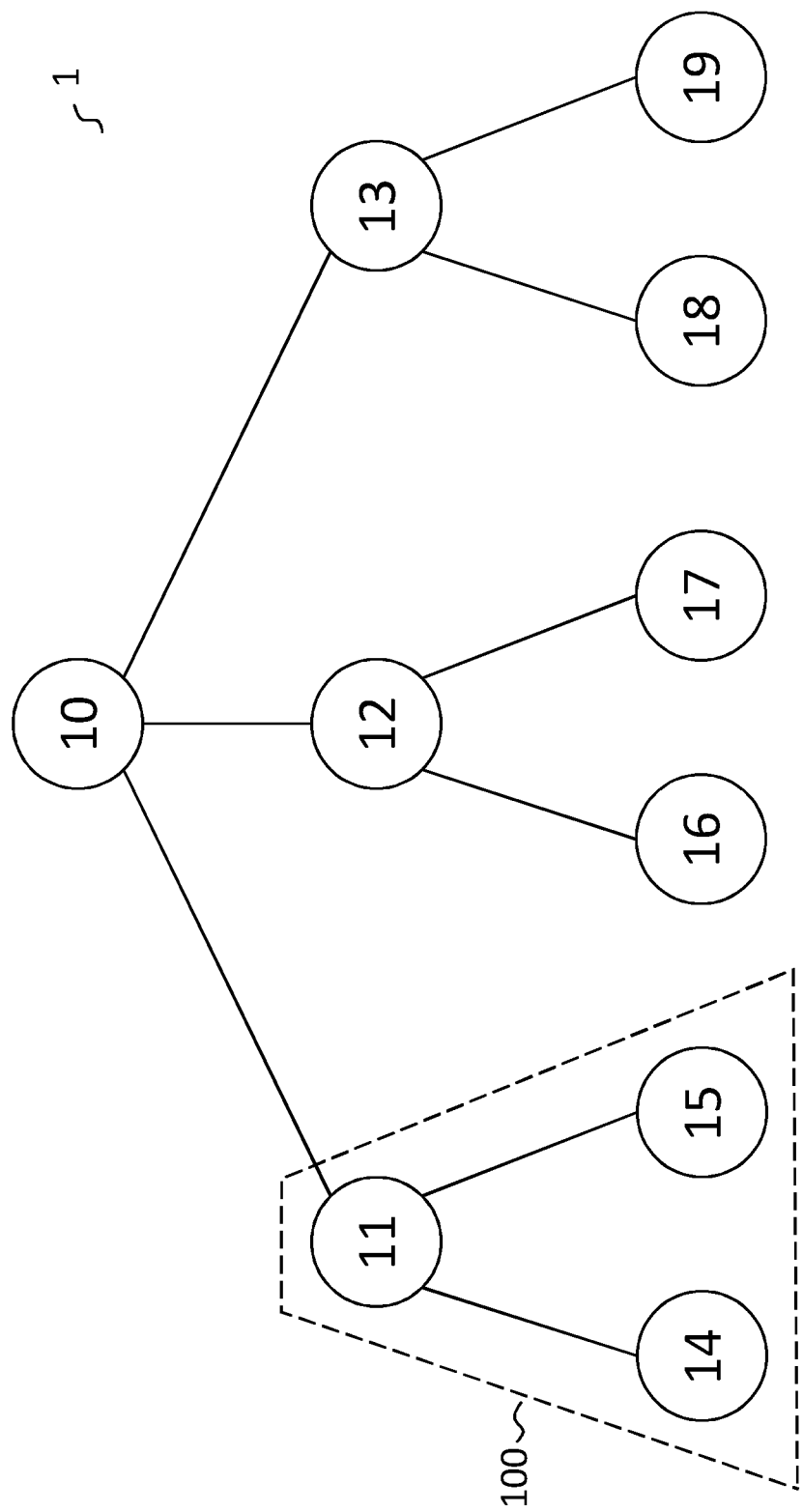
FIG. 1 shows a schematic of an execution branch of an example computer program.

FIG. 1 shows a schematic of an exemplary execution tree structure, or tree 1, of a computer program representing different execution paths of the computer program. The tree structure 1 shown has nodes 10 to 19 as well as edges which connect the nodes along the execution paths. In this instance, node 10 is a root node, nodes 11, 12 and 13 are inner nodes and nodes 14 to 19 are leaf nodes. Also shown is a sub-tree 100 which includes inner node 11 and the leaf nodes or leaves 14 and 15. Each path in the execution tree structure from the root node 10 to one of the leaf nodes 14 to 19 corresponds to an execution path of the executed computer program. An example of an execution path can be provided by successive nodes 10, 11, and 15.

Figure 2:
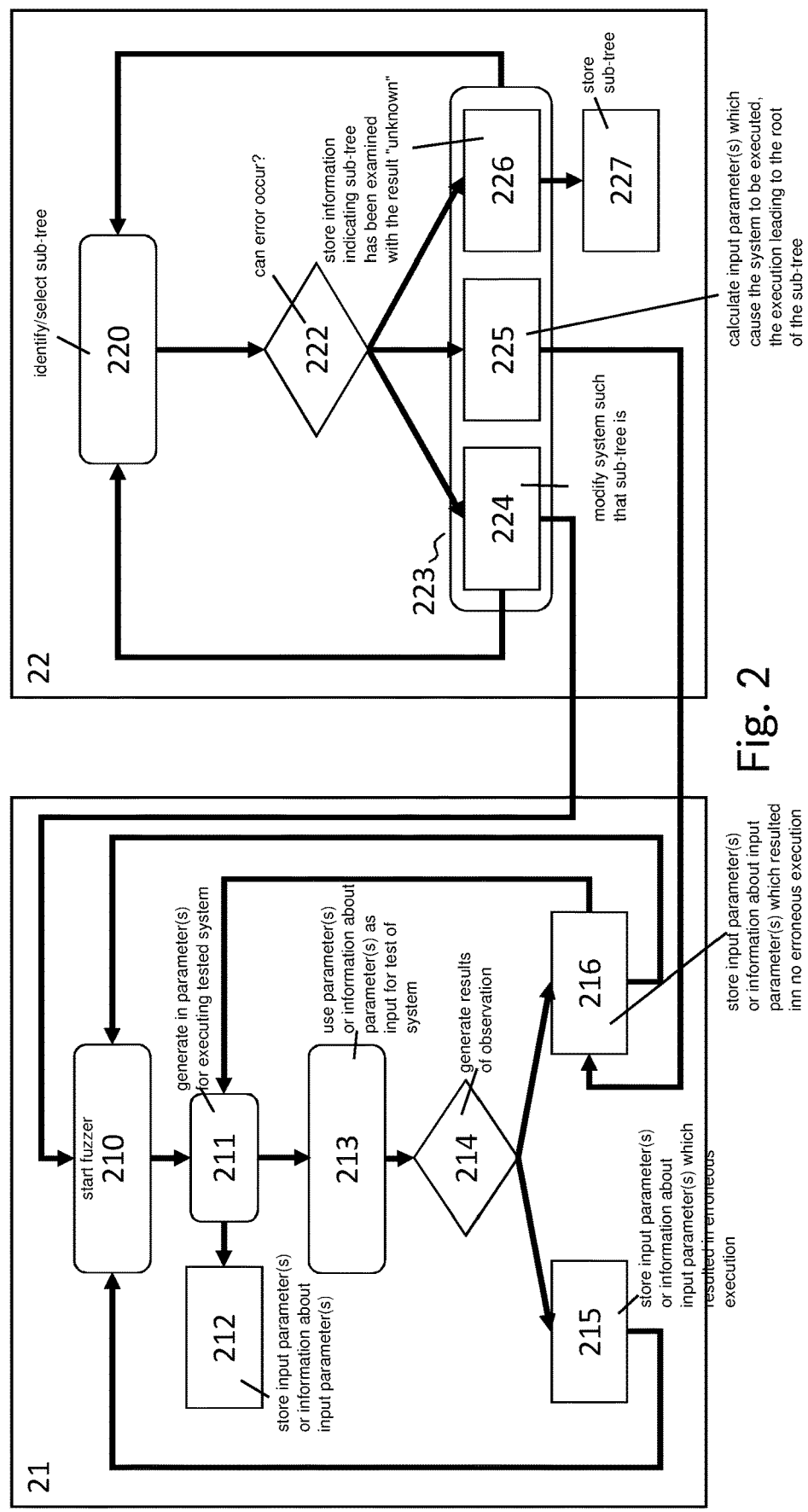
FIG. 2 shows a schematic of an exemplary sequence of an example method for testing a computer program in accordance with the present invention.

FIG. 2 shows a schematic of an exemplary method sequence for testing a computer program. Here, the method comprises dynamic analysis steps shown in block 21 as well as static analysis steps shown in block 22.

In a step 220 of the static analysis, a sub-tree of the tree structure is identified or selected based on an execution tree structure of a computer program. The execution tree structure may be received as an input parameter or may be created as a function of an input parameter such as a source code or a binary file. For the case of a hardware system to be tested, an execution tree structure may also be created as a function of a hardware layout.

In this case, the tree structure may be created for the system or computer program to be tested using available technologies, for example using symbolic execution, software theorem provers or a combination of these methods.

In a following step 222, in a computer-implemented static analysis an examination is carried out for the identified or selected sub-tree to see if an error can occur in the execution of a computer program execution path which is contained or represented in said sub-tree. The analysis may preferably supply three different results: "no error can occur", "an error can occur", or "unknown", where "unknown" results if the testing system cannot decide, based on the analysis, whether an error can or cannot occur.

The analysis to determine freedom from error may be carried out using available technologies, in particular model checking, limited model checking, theorem provers, typification, abstract interpretation, symbolic execution, concolic execution or combinations thereof.

After step 222, the method leads to a block 223 in which steps are carried out depending on the result in step 222.

For the result "no error can occur", the method branches from step 222 to step 224 of block 223. There, the examined system is modified such that the sub-tree which has been determined as error-free is no longer tested.

In particular, the examined system is modified such that in a dynamic analysis it is no longer possible to execute the sub-tree which has been determined as error-free. For example, this modification may be carried out by replacing the root directory or root in the source code of the part of the executable computer program corresponding to the sub-tree which had been determined as being error-free with an exit statement (exit statement or terminating statement). Alternatively, a corresponding statement can be inserted into the binary code of the computer program at a corresponding point.

In a further modification variant, the path condition from the root of the overall tree to the root of the sub-tree may be calculated, and a test of these path conditions may be added as a first statement of the computer program to be tested. For example, in this alternative input parameters which do not meet the path conditions cannot be executed, or it can be ensured that in the dynamic analysis a fuzzer in particular generates input parameters which fulfill the negated path condition. This also allows prevention of (further) dynamic testing of this sub-tree or of the corresponding part of the computer program. This variant may be especially helpful if the system to be tested is running on separate hardware on which software cannot be automatically exchanged easily or efficiently. Other methods are also possible for this purpose.

The system so modified is routed to block 21 and from there is routed to step 210 of the dynamic analysis.

Also, in step 224 of block 223 the tree for the static analysis is modified such that the sub-tree determined as being error-free is no longer analyzed in the static analysis. To this end, the modified tree is routed to step 220 as a new input parameter which corresponds to a start of the static analysis as described above.

In one variant, if it is not possible to determine freedom from error for a sub-tree, but a condition can be extracted under which execution of the part of the computer program corresponding to the sub-tree leads to an error, this result may be treated similar to the result "no error can occur". In this case, instead of modifying the tree structure by removing the sub-tree, the sub-tree in the tree structure may be exchanged with an assurance statement for the denied condition. This approach may be particularly useful if the method used for determining freedom from error provides precise results for calculating the condition.

For the result "unknown", step 222 branches to step 226. Information indicating that the corresponding sub-tree had already been examined, with the result of "unknown", may be stored there. This information may also be used to prevent (repeated) reexamination of this sub-tree in ongoing static analyses. For example, the result "unknown" may occur if a time limit is exceeded while calculating the corresponding static analysis. Subsequently, the sub-tree which yields the result "unknown" may be stored in step 227 so that it is not calculated again.

For the result "an error can occur", step 222 branches to step 225. In this step, the testing system preferably calculates one or more input parameters for the system to be tested which cause the system to be tested to be executed, the execution leading to the root of the sub-tree which had been identified as error laden. The calculation of such input parameters can be done using symbolic execution, concolic execution, model checking, limited model checking, abstract interpretation, typification, test case generation or theorem provers.

This at least one generated input parameter is preferably transmitted to the dynamic analysis in step 225, in particular to block 216 of the dynamic analysis 21, the block corresponding to a set of interesting input parameters, that is to say input parameters to be included in the ongoing dynamic analysis.

Instead of adding the at least one generated input parameter to the set of input parameters to be taken into account, in an alternative variant a path condition is calculated for the sub-tree, and a new, parallel test instance of the dynamic analysis is started, in particular a fuzzing instance. Subsequently, in the new test instance the only input parameters generated are those which fulfill the path condition. As a result, the new test instance concentrates on finding errors in sub-trees which were identified by the static analysis as (potentially) erroneous. For example, a new fuzzing instance of this kind may be included if the fuzzer or fuzzers which are already running are restarted for a new iteration. Different fuzzing instances can also share their sets of interesting input parameters. This approach is particularly useful when additional computing resources are available or if techniques are used for the static analysis which contain over-approximating statistical analyses which can possibly deliver many false positive results.

At the end of the respective step in block 223, the static analysis 22 is continued again in step 220. In the process, in particular for a branching from step 224 (resulting in "no error can occur"), a restart of the static analysis is carried out based on the modified tree structure received as an input parameter. In an alternative variant, instead of restarting the static analysis with a modified tree structure, the static analysis may also be included again in or continued with the original, or unchanged, tree structure. In this case, information about sub-trees which have already been analyzed is stored and taken into account for the further analysis in order to avoid repeatedly analyzing the same sub-trees. This approach may be taken especially if the calculation of a modified tree structure is time-consuming or CPU-intensive.

In preferred variants of the described static analysis according to the present invention, the analysis is carried out using at least two different analysis methods, a first static analysis method examining the execution structure from the root in the direction of the leaves of the execution structure and the second static analysis method examining the execution structure from the leaves in the direction of the root. In this case, in the static analysis of a sub-tree of the execution structure both analysis methods are preferred to be implemented simultaneously. This allows the size of the part of the structure to be examined by each analysis method to be reduced, which makes it possible to carry out the static analysis faster and with a higher precision.

The dynamic analysis in block 21 may be implemented using a fuzzer in particular. Fuzz testing (also: fuzzy testing or fuzzing) is a known method for dynamically testing software for weak points. In this approach, a tested system (SUT—system under test), typically a computer program, is executed using input parameters that the system receives from a fuzzer. While the system is executed, in particular while the software is executed, in other words while the software is being processed by a processor, the fuzzer observes the behavior of the tested system. In the process, the fuzzer identifies provided input parameters as error-relevant if the tested system terminates during the execution or if it indicates other undesired behavior. Known, available fuzzers include Libfuzz, AFL-fuzz or Hongfuzz, for example.

Useful fuzzing variants include white box fuzzing, black box fuzzing and binary fuzzing, there being no source code required for the latter, but rather only a compiled executable file. Hardware fuzzing can also be used if the system to be tested is a hardware system which executes the functionality to be tested.

The fuzzer used may run on the same hardware as the system to be tested. Alternatively, the fuzzer may run on different hardware, the input parameters and output parameters or results or observations of the tested system being communicated via suitable interfaces.

Block 21 in FIG. 2 shows steps of an automated dynamic analysis of a tested system. In the process, a fuzzer is started in step 210.

In the following step 211, the fuzzer generates at least one input parameter for executing the tested system. The generation of the input parameters is preferably based on heuristics and may also take into account white box information, for example so that input parameters which lead to new execution paths are preferred when executing the system. In this case, generation may depend on a set of stored input parameters which are interesting or which should be taken into account (interesting set), the set having already been created and possibly needing to be expanded as analysis proceeds. In the process, new input parameters are generated by varying parameters and values as a function of the stored input parameters.

Subsequently, at least one input parameter or one piece of information about it is stored in step 212 in a log for test cases which have already been executed or initiated, and the parameter or information is put to use in step 213 as an input parameter for a test of the tested system, the tested system being executed as a function of said input parameter. If the system is a computer program or an embedded system comprising a computer program, the execution corresponds to calculation steps of a processor as a function of the input parameter. During execution, the behavior and output parameters of the tested system are observed by the testing system. In the process, when a computer program is tested execution paths may be observed by adding observers or software monitors while the program is compiling.

A result of the observation is generated in the next step 214. Possible results include the results "erroneous execution" and "no erroneous execution" in particular. Examples of erroneous execution of a tested computer program include run-time exceptions, violated assertions, assumptions of inadmissible system states, system terminations, erroneous memory accesses (buffer overflow, access after memory release), erroneous resource accesses due to erroneous synchronization in multi-threaded programs or programs locking up, for example (e.g., livelocks, deadlocks, etc.).

After step 214, in the case of the result "erroneous execution" a branching to step 215 occurs, the input parameter or information about the input parameter which resulted in an erroneous execution being stored in this step. The goal is an error set or log for such input parameters.

After step 214, in case of the result "no erroneous execution" a branching to step 216 occurs, the input parameter or information about the input parameter which resulted in no erroneous execution being stored in this step. The goal is a stored set of interesting input parameters (interesting set), i.e. parameters which should be taken into account by the fuzzer for the further dynamic analysis. The accounting of these parameters proceeds as described in step 211 in that the fuzzer in turn generates input parameters for the further analysis as a function of input parameters from this set.

Steps 215 and 216 in turn branch to step 210 in which the fuzzer again generates input parameters. In alternative variants, the method may also be ended after the first error behavior is encountered.

After the system to be tested is modified in step 224 of block 22, it is preferable to branch to step 210, in other words the fuzzer is restarted based on the modified system to be tested. Instead of a restart of the fuzzer for each modification (accordingly for every sub-tree determined as being error-free) in step 224 the fuzzing may also only be restarted if a plurality of sub-trees had been analyzed or found to be error-free. This approach is particularly helpful if restarting the fuzzing entails significant execution effort or if sub-tree analyses proceed very quickly (for example at the beginning of the analysis).

In a preferred variant, dynamic and static analyses proceed in parallel. However, in an alternative variant, they can also proceed sequentially, for example by suspending the dynamic analysis after a specific time, carrying out the static analysis and subsequently continuing the dynamic analysis again depending on its result (if indicated, with a modified system to be tested, in particular). This can be useful, in particular if there are no (or insufficient) parallel computing capacities available. Suspending and starting the dynamic or static analysis may depend respectively on heuristics, for example on the elapsed time or on progress of an analysis.

The overall computer-implemented and automated testing of the system using static and dynamic analysis can recognize and identify execution errors reliably and particularly efficiently in terms of time and resources.

The stored results of the test (in particular the set of input parameters which lead to erroneous behavior, the set of input parameters already used for the dynamic analysis, the set of input parameters which are to continue to be taken into account by the dynamic analysis (interesting set) or information about the sub-trees identified in the static analysis as error-free) may be used to improve the system. For example, debugging of errors or analysis of possible consequences may be performed, for example due to safety requirements or for a product or security release for the system.

What is claimed is:

1. A computer-implemented method for testing a system, the tested system including a computer program, the method comprising the following steps:

examining, using a static analysis, a first part of an execution structure for the system to determine whether the system executes execution paths corresponding to the first part without errors when the first part of the execution structure is executed, wherein the first part of the execution structure is a sub-tree that is determined to be without error by the examining of the first part of the execution structure; and in response to determining that the sub-tree is without error, modifying the system such that in a dynamic analysis it is no longer possible to execute the sub-tree, wherein the modifying includes replacing a root directory or root in a source code of a part of the computer program corresponding to the sub-tree which had been determined as being error-free with an exit statement or terminating statement; and based on determining, in the static analysis, the execution paths corresponding to the first part executed without error, examining the system using the dynamic analysis which leaves out the execution paths corresponding to the first part of the execution structure corresponding to the sub-tree that is determined to be without error.

2. The method as recited in claim 1, wherein the system is examined using a further static analysis, and for the further static analysis the first part of the execution structure is left out based on determining the execution paths corresponding to the first part executed without error in the static analysis for the first part of the execution structure.

3. The method as recited in claim 1, wherein a first input parameter is calculated for the first part of the execution structure depending on the static analysis, and the first input parameter is stored in a set of input parameters to be taken into account for a dynamic analysis, based on determining the execution paths corresponding to the first part executed with errors in the static analysis for the first part of the execution structure.

4. The method as recited in claim 3, wherein an input parameter for which the static analysis indicates that errors are occurring in the execution is calculated as the first input parameter.

5. The method as recited in claim 1, wherein the tested system includes a computer program, the execution structure is a tree structure representing execution paths of the computer program and the dynamic analysis includes an execution of a program code of the computer program on a processor.

6. The method as recited in claim 1, wherein the static analysis and the dynamic analysis are executed in parallel.

7. The method as recited in claim 1, wherein the static analysis and the dynamic analysis are executed sequentially.

8. The method as recited in claim 1, wherein the system is examined using the dynamic analysis to determine whether the system is being executed error-free for at least one specific input parameter.

9. The method as recited in claim 8, wherein the system is examined, using the dynamic analysis, to determine whether a run-time exception, or a violated assertion, or an assumption of an inadmissible system state, or a system termination, or an erroneous memory access, or an erroneous resource access, or a program lock-up, is occurring during the execution of the system.

10. The method as recited in claim 8, wherein the system is improved depending on the dynamic analysis remedying an ascertained error.

11. The method as recited in claim 1, wherein an examination is performed using the static analysis to determine whether a run-time exception, or a violated assertion, or an assumption of an inadmissible system state, or a system termination, or an erroneous memory access, or an erroneous resource access, or a program lock-up, occurs during the execution of the execution paths corresponding to the first part of the execution structure.

12. The method as recited in claim 1, wherein the dynamic analysis includes a fuzzing, the dynamic analysis being performed for at least one input parameter generated by a fuzzer.

13. The method as recited in claim 1, wherein the static analysis includes a model checking, or a limited model checking, or an examination using theorem provers, or a typification, or an abstract interpretation, or a symbolic execution, or a concolic execution.

14. The method as recited in claim 1, wherein the static analysis includes a computer-implemented examination of the system using an execution structure without the system actually being executed, using a formal mathematical method.

15. The method as recited in claim 1, wherein the examination of the first part of the execution structure for the system is carried out in the static analysis using two different analysis methods, a first analysis method of the two different analysis methods examining the first part of the execution structure from a root of the execution structure in a direction of a leaf of the execution structure, and a second one of two different analysis methods examining the first part of the execution structure from the leaf of the execution structure in the direction of the root of the execution structure.

16. The method as recited in claim 1, wherein the dynamic analysis includes a computer-implemented examination of the system performed while the system is actually being executed.

17. A non-transitory machine-readable memory on which is stored a computer program for testing a system, the tested system including a computer program, the computer program, when executed by a computer, causing the computer to perform the following steps:

examining, using a static analysis, a first part of an execution structure for the system to determine whether the system executes execution paths corresponding to the first part without errors when the first part of the execution structure is executed, wherein the first part of the execution structure is a sub-tree that is determined to be without error by the examining of the first part of the execution structure; and in response to determining that the sub-tree is without error, modifying the system such that in a dynamic analysis it is no longer possible to execute the sub-tree, wherein the modifying includes replacing a root directory or root in a source code of a part of the computer program corresponding to the sub-tree which had been determined as being error-free with an exit statement or terminating statement; and based on determining, in the static analysis, the execution paths corresponding to the first part executed without error, examining the system using the dynamic analysis which leaves out the execution paths corresponding to the first part of the execution structure corresponding to the sub-tree that is determined to be without error.

18. A testing system for testing a system, comprising:

a non-transitory machine-readable memory on which is stored a computer program for testing the system, the computer program, when executed by a processor, causing the processor to perform the following steps:

examining, using a static analysis, a first part of an execution structure for the system to determine whether the system executes execution paths corresponding to the first part without errors when the first part of the execution structure is executed, wherein the first part of the execution structure is a sub-tree that is determined to be without error by the examining of the first part of the execution structure; and in response to determining that the sub-tree is without error, modifying the system such that in a dynamic analysis it is no longer possible to execute the sub-tree, wherein the modifying includes replacing a root directory or root in a source code of a part of the computer program corresponding to the sub-tree which had been determined as being error-free with an exit statement or terminating statement; and based on determining, in the static analysis, the execution paths corresponding to the first part executed without error, examining the system using the dynamic analysis which leaves out the execution paths corresponding to the first part of the execution structure corresponding to the sub-tree that is determined to be without error;

the processor for executing the computer program; and at least one interface to the tested system.

* * * * *